(12) United States Patent
Saccavini et al.

(10) Patent No.: US 11,758,631 B2
(45) Date of Patent: Sep. 12, 2023

(54) SYNCHRONOUS FLYBACK CONVERTER FOR DRIVING LED LOADS

(71) Applicant: Tridonic GmbH & Co KG, Dornbirn (AT)

(72) Inventors: Lukas Saccavini, Dorbin (AT); Stefan Stark, Dornbirn (AT); Ludwig Erasmus De Clercq, Dornbirn (AT)

(73) Assignee: Tridonic GmbH & Co KG, Dornbirn (AT)

(*) Notice: Subject to any disclaimer, the term of this patent is extended or adjusted under 35 U.S.C. 154(b) by 0 days.

(21) Appl. No.: 17/618,921

(22) PCT Filed: Jun. 29, 2020

(86) PCT No.: PCT/EP2020/068208
§ 371 (c)(1),
(2) Date: Dec. 14, 2021

(87) PCT Pub. No.: WO2020/260681
PCT Pub. Date: Dec. 30, 2020

(65) Prior Publication Data
US 2022/0312564 A1  Sep. 29, 2022

(30) Foreign Application Priority Data
Jun. 27, 2019 (EP) .................................. 19182785

(51) Int. Cl.
*H05B 45/30* (2020.01)
*H05B 45/385* (2020.01)

(52) U.S. Cl.
CPC .................................. *H05B 45/385* (2020.01)

(58) Field of Classification Search
CPC .... H05B 45/37; H05B 45/325; H05B 45/355; H05B 45/382; H05B 45/385; H05B 45/3725
See application file for complete search history.

(56) References Cited

U.S. PATENT DOCUMENTS 10,172,197 B1    1/2019  Gao et al.
10,320,300 B2 *  6/2019  Fang .................... H03F 3/45071
(Continued)

FOREIGN PATENT DOCUMENTS

GB    2490542       11/2012
WO    2007135452    11/2007

OTHER PUBLICATIONS

PCT/EP2020/068208, International Search Report and Written Opinion; dated Jul. 31, 2020, 14 pages.
(Continued)

*Primary Examiner* — Tung X Le
(74) *Attorney, Agent, or Firm* — Andrus Intellectual Property Law, LLP (57) ABSTRACT

The invention relates to a synchronous flyback converter (100) having terminals for supplying an LED load. The synchronous flyback converter (100) comprises a sensing winding ($L_w$) coupled to a primary winding ($L_p$) of a transformer T of the flyback converter (100), a control unit (106) controlling a primary side switch (S1) in series to the primary winding ($L_p$) of the flyback converter (100) using a feedback signal for a closed loop control of a secondary side voltage of the flyback converter (100) by controlling the frequency and/or duty cycle of the switching of the primary side switch (S1), wherein the feedback signal is derived from a sensing voltage across the sensing winding ($L_w$) sampled once during a switch-on time of a secondary side switch (S2) of the flyback converter (100).

10 Claims, 7 Drawing Sheets

(56) References Cited

U.S. PATENT DOCUMENTS

| | | | | |
|---|---|---|---|---|
| 2013/0033903 A1* | 2/2013 | Teggatz | ................. | H02M 1/42 |
| | | | | 363/16 |
| 2013/0300307 A1* | 11/2013 | Ren | .................... | H02M 1/4258 |
| | | | | 315/219 |
| 2016/0111961 A1* | 4/2016 | Balakrishnan | .... | H02M 3/33507 |
| | | | | 363/21.12 |
| 2018/0132313 A1* | 5/2018 | Kuang | ............... | H05B 45/3725 |
| 2018/0159437 A1 | 6/2018 | Song et al. | | |
| 2018/0351462 A1 | 12/2018 | Li et al. | | |

OTHER PUBLICATIONS

EP20734410.2, European Search Report dated Dec. 1, 2022, 4 pages.

\* cited by examiner

SYNCHRONOUS FLYBACK CONVERTER FOR DRIVING LED LOADS

CROSS REFERENCE TO RELATED APPLICATIONS

The present application is the U.S. national stage application of international application PCT/EP2020/068208 filed Jun. 29, 2020, which international application was published on Dec. 30, 2020 as International Publication WO 2020/260681 A1. The international application claims priority to European Patent Application 19182785.6 filed Jun. 27, 2019.

TECHNICAL FIELD OF THE INVENTION

The invention relates to a synchronous flyback converter having terminals for supplying a LED load.

BACKGROUND OF THE INVENTION

In switched DC-DC power supply of different kinds of electrical devices, power rectifiers are utilized in order to output a rectified output voltage. Typically, diodes are employed on the secondary side in order to obtain the rectified output voltage.

A flyback converter with following rectification stage is a typical known example for a switched DC/DC converter.

A conventional flyback converter can comprise, on the primary side, a primary winding of a transformer and a switch, and on the secondary side a secondary winding of the transformer connected to one or more rectifying diodes and an output capacitor over which a load can be connected. Such a converter has a large voltage drop over the diode.

So-called synchronous flyback converter are provided with a preferably actively controlled switch on their secondary side, such as e.g. a FET transistor. Such an arrangement will reduce the losses on the secondary side.

A control unit for controlling the primary side switch of the flyback is often arranged to be on the potential of the primary side, such that feedback signals from the secondary side can not easily be fed back to the control unit e.g. for a closed-loop control of the LED current and/or the output voltage of the flyback. Therefore it is known to indirectly detect secondary side entities, such as e.g. the secondary side output voltage indirectly, i.e. on the basis of primary side measurements. In this manner no feedback signal has to be transferred over the galvanic isolation of the flyback.

Thus, it is an objective to provide for an improved synchronous flyback converter, especially with regard to an indirect detection of the secondary side voltage (output voltage of the flyback) which may supply a LED load.

SUMMARY OF THE INVENTION

The object of the present invention is achieved by the solution provided in the enclosed independent claims. Advantageous implementations of the present invention are further defined in the dependent claims.

According to a first aspect, the invention relates to a synchronous flyback converter having terminals for supplying an LED load, comprising: a sensing winding coupled to a primary winding of a transformer of the flyback converter, and a control unit (on the potential of the primary side of the flyback) controlling a primary side switch in series to the primary winding of the flyback converter using a feedback signal for a closed loop control of the secondary side voltage of the flyback converter by controlling the frequency and/or duty cycle of the switching of the primary side switch, wherein the feedback signal is derived from a sensing voltage across the sensing winding sampled once during a switch-on (i.e. conducting) cycle of a secondary side switch of the flyback converter, or at every n-th switch-on cycle thereof, n being an integer.

The control unit may control the secondary side switch such that there are time periods with negative current flow on the secondary side. Thus, the current on the secondary side will flow in two different directions (in different time periods).

In an embodiment of the first aspect, the sensing voltage is sampled at a point in time when the secondary side current through the secondary side switch is at least close to zero.

In an embodiment of the first aspect, at least close to zero corresponds to 10%, preferably 5%, of the total period of the switch on time.

In an embodiment of the first aspect, the control unit is designed to compensate, by applying a calibration value, any contribution of secondary side resistive elements to the sensing voltage, if the sensing voltage is not sampled at a point in time at which the secondary side current is zero.

In an embodiment of the first aspect, the control unit controls the secondary side switch.

In an embodiment of the first aspect, the converter comprises a comparator configured to compare the primary side current $i_p$ to a reference value $i_{ref}$.

In an embodiment of the first aspect, the control unit is configured to measure a time the primary switched is closed ($T_p$) and to calculate a ratio:

$$\text{ratio} = \Delta/T_p,$$

wherein a time $\Delta$ corresponds to the time in which the primary side current $i_p$ is greater than the reference value $i_{ref}$.

In an embodiment of the first aspect, the control unit is configured to measure the winding voltage at a time point $t_s$:

$$t_s = (T_s \Delta)/T_p$$

wherein $T_s$ corresponds to the time the secondary switch is closed.

The control unit may be configured to add to the time point $t_s$ a constant correction factor, which optionally may lead to a reduction or increase of the time point ts.

The correction factor may depend on a sensing signal indicating e.g. one or more of a value of the load, a temperature e.g. of the LED load etc.

The point in time for the sampling is preset to be within a preset minimum value, preferably between 1 ns and 40 ns, preferably adjustable, preferably a clock cycle of the control unit, and maximum value of (Ts-settlingTimeSH), wherein settlingTime SH is a settling time of a Sample&Hold module in the signal path of the sampled signal.

According to a second aspect the invention relates to a method for a synchronous flyback converter having terminals for supplying an LED load, comprising the step of: controlling a primary side switch in series to the primary winding of the flyback converter using a feedback signal for a closed loop control of the secondary side voltage of the flyback converter by controlling the frequency and/or duty cycle of the switching of the primary side switch, wherein the feedback signal is derived from a sensing voltage across the sensing winding sampled once during a switch-on time of a secondary side switch of the flyback converter.

BRIEF DESCRIPTION OF THE DRAWINGS

The invention will be explained in the followings together with the figures.

DETAILED DESCRIPTION OF THE PREFERRED EMBODIMENTS

Aspects of the present invention are described herein in the context of a synchronous flyback converter.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of a synchronous flyback converter will be presented. However, as those skilled in the art will readily appreciate, these aspects may be extended to aspects of synchronous flyback converters without departing from the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Figure 1:
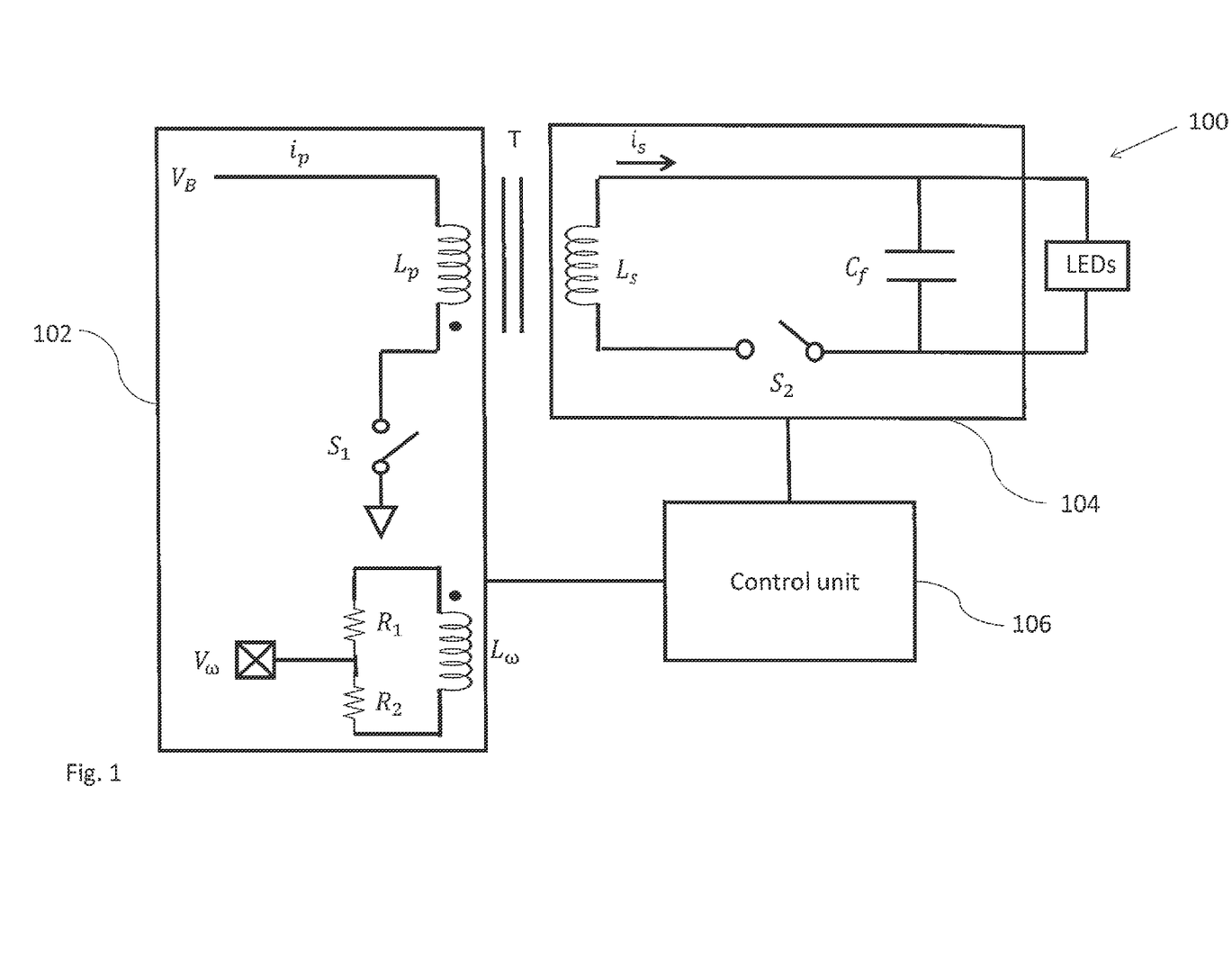
FIG. 1 shows a synchronous flyback converter according to an embodiment.

FIG. 1 shows a synchronous flyback converter 100 according to an embodiment.

The synchronous flyback converter 100 comprises a primary side 102 and a secondary side 104 of a transformer and has terminals for supplying an LED load (LEDs).

Furthermore, the synchronous flyback converter 100 comprises:
- a sensing winding $L_w$ coupled to a primary winding $L_p$ of a transformer T of the flyback converter 100; and
- a control unit 106, potentially on the primary side of the transformer and controlling a primary side switch S1 in series to the primary winding $L_p$ of the flyback converter 100, the switching characteristics being based on a feedback signal for a closed loop control of a secondary side voltage of the flyback converter 100 by controlling the frequency and/or duty cycle of the switching of the primary side switch S1.

The feedback signal is derived from a sensing voltage across the sensing winding $L_w$ sampled once during a switch-on cycle (conducting cycle) of a secondary side switch (S2) of the flyback converter 100, or at every n-th cycle, n being an integer. Preferably the sampling takes place towards the end of a switch-on cycle.

As shown in FIG. 1, a flyback transformer T has a primary winding $L_p$ having one end connected to an input voltage $V_B$ and another end connected to a drain terminal of the primary switch S1 which can be implemented by a MOS transistor.

The control unit 106 can be connected to a gate terminal of the primary switch S1 and configured to issue pulse signals to control the switching operations of the primary switch S1.

When the primary switch S1 is turned on, the primary winding $L_p$ receives an input current $i_p$ from an input terminal and thus stores energy in the primary winding $L_p$. In the meantime, a synchronous switch or secondary switch S2, that can be implemented by a MOS transistor and connected to a second secondary winding $L_s$ of the flyback transformer T, is turned off preferably through the control unit 106. As the flyback converter is designed as synchronous flyback converter 100 according to this invention the secondary switch S2 is being provided on the secondary side 104 instead of a rectifier as it would be used in a single switch flyback.

Moreover, when the primary switch S1 is turned off, the synchronous or secondary switch S2 is turned on through the control unit 106, so that the energy stored in the primary winding $L_p$ can be transferred to the secondary side 104 of the flyback transformer T. This induces a high-frequency voltage across the second secondary winding $L_s$ and causes a secondary current to flow through the synchronous switch S2.

With the repeated switch operations of the synchronous switch S2, the high-frequency voltage variations induced across the second secondary winding $L_s$ can be rectified into a DC voltage. This rectified DC voltage may present a ripple and therefore will be typically filtered by an output capacitor $C_f$ so as to generate a stabilized output DC voltage $V_{out}$ which is provided to a LED load (LEDs).

The control unit 106 can be configured to (indirectly) detect the actual value of the output voltage of the synchronous flyback converter 100, compare it with a nominal value, apply a control algorithm on any deviation between the actual and the nominal value and control the switching of the primary side switch depending on the outcome of the control algorithm.

The control unit 106 may be formed by an integrated circuit, e.g. ASIC (application specific integrated circuit), FPGA (field programmable array) or microcontroller.

Figure 2:
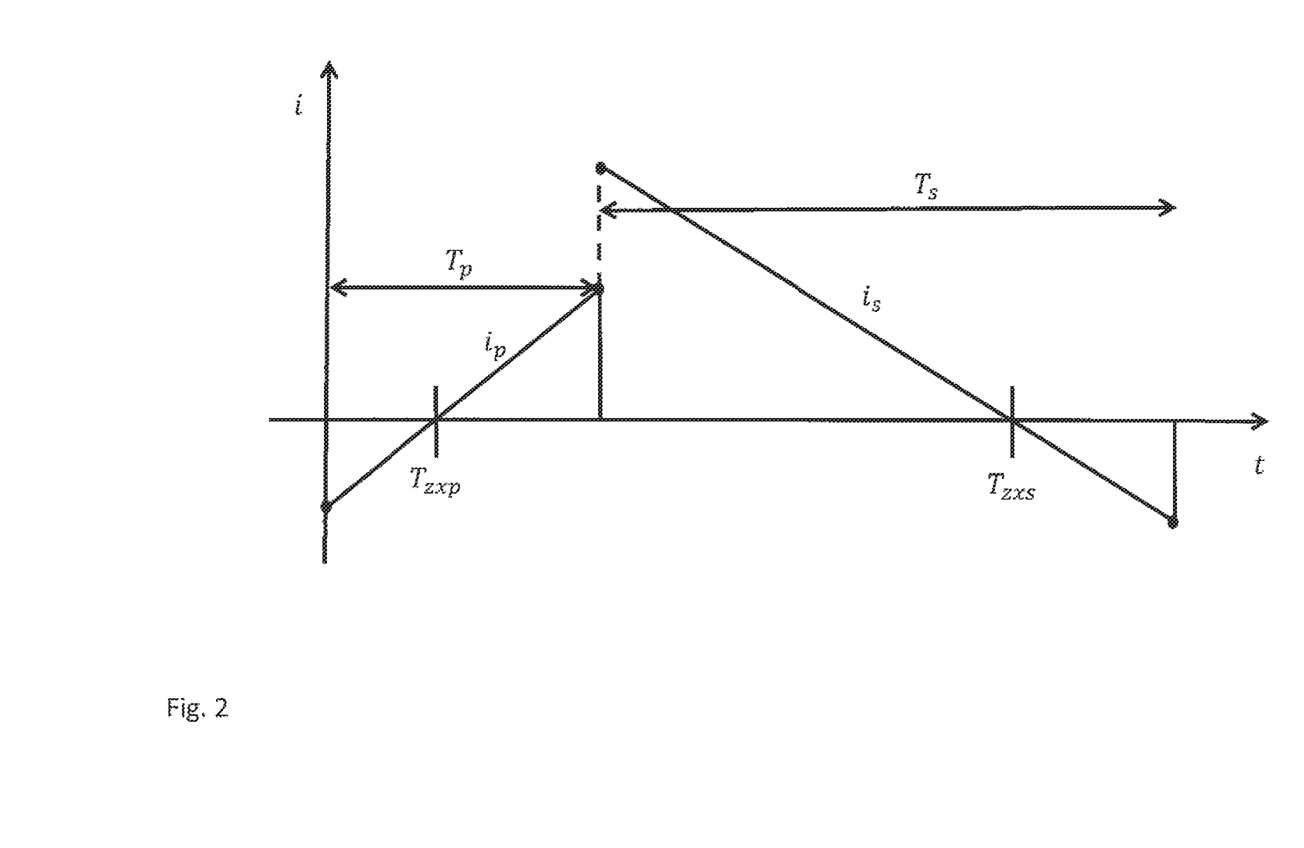
FIG. 2 shows a current in a synchronous flyback converter as a function of time according to an embodiment.

FIG. 2 shows a primary side current $i_p$ and a secondary side current $i_s$ in a synchronous flyback converter 100 as a function of time t according to an embodiment.

An object of the invention is to have the LED voltage measurement sampling (e.g. once per switching-on cycle of the secondary side switch, or only at every n-th switching on cycle)) as close as possible at the point in time when the secondary side current $i_s$ (through the conducting secondary side switch S2) crosses the zero line, namely at time $T_{ZXS}$ in FIG. 2, coming from a positive current flow direction towards a negative flow direction (the negative flow direction being a smaller portion).

Moreover, use can be made of the fact that the ratio of positive current flow to negative current flow on the primary side 102 is identical to the corresponding ratio on the secondary side 104.

Therefore, by monitoring the time period of the negative or positive current flow on the primary side 102, knowing the total switching on time on the primary side $T_p$, knowing the total switching on time of the secondary side switch $T_s$, then the zero crossing time point of the current of the secondary side $T_{ZXS}$ can be indirectly determined by multiplying the total switching on time of the secondary side switch S2 starting from zero, with the corresponding ratio of the primary side current flow.

Thus, the LED-voltage measurement sampling will always be done at least very close to the zero crossing, which has the advantage that as no current is flowing on the secondary side 104, resistive elements on the secondary side 104 cannot influence the LED voltage measurement by their own voltage drop.

Very close to the zero crossing corresponds to 10%, preferably 5%, of the total period of the switch on time.

During calibration after production of the synchronous flyback converter 100 any contribution on the voltage measurement coming from a resistive secondary side element can be measured and, then, used as a calibration value in the following measurements during the operation of the synchronous flyback converter.

Therefore, the invention also relies on a synchronous flyback, wherein an auxiliary winding $L_w$ coupled to the primary side 102 of the synchronous flyback converter 100 is used for the LED voltage measurement.

At a given point in time, during the switch on cycle of the secondary side switch S2, a value representing the LED voltage measurement can be sampled.

Moreover, this measurement can then be corrected by the calibration value determined at the end of the production and, thus, at the factory.

The closer the sample point in time is to the zero crossing of the secondary side current flow, the less the calibration value is important.

Preferably, the calibration approach is used for low-loads, in which the current flow is decreasing less rapidly than in high loads, which leads to higher uncertainties as to the precise zero crossing point in time.

On the other way around, the approach of using the precise zero crossing sampling time is preferably used at higher loads.

Thus, according to an embodiment, the two above mentioned implementation forms are used depending on a dimming level.

The LED voltage influencing the steepness of the reduction of the secondary side current flow is essentially effected by the LED load, which means by changing the LED module this will vary. Thus, if a multi-load converter is foreseen, for a low load range the calibration approach is preferably used, while if a LED module in the higher load range is used, the zero crossing approach is preferably used. In this embodiment, a multi-load means various LEDs with a different total forward voltage.

The dimming does not affect the steepness of the reduction of the secondary side flow, but rather the "duty cycle" of the positive current flow to the negative current flow.

The invention advantageously uses this setup and improves the quality of the LED-voltage measurement by having a dedicated sampling time point per cycle at which the LED voltage measurement is taken.

In an embodiment, the sync flyback converter 100 is driven with a negative current $i_p$. In this embodiment, $i_p$ can, then, be checked when the primary current $i_p$ first becomes positive.

After measuring the time that $i_p$ is positive, the ratio to that of the primary switch on time can be used in order to set a time when a sample and hold should capture a voltage from the additional winding $L_w$. With a ratio adjust time, it can roughly be known when the cross over will happen on the secondary side 104 and, therefore, adjust the time.

This has the advantage that an accurate measurement with information can be obtained.

Moreover, this provides the advantage that a more accurate current estimation and, therefore, better performance in light control is achieved.

Furthermore, this has the advantage that a cheap way of determining the led voltage is achieved.

In the following, for the sake of completeness, a summary of the steps which lead to the determination of the LED voltage will be done.

Since the aim is to measure the LED voltage only, voltage drops due to things like secondary FET, resistive losses on secondary side etc. are not desired. Moreover, measuring the LED voltage from the primary side 102 has the advantage of being cheaper, since there is no need to cross the safety extra low voltage (SELVC) barrier.

In FIG. 2, if $i_s=0$, no current is flowing on the secondary side 104 and, therefore, no other voltage can be reflected other than the LED voltage $V_{LED}$.

Use can be made of the voltage $V_w$ and a sample-and-hold chip with analog-to-digital converter (ADC).

Figure 3:
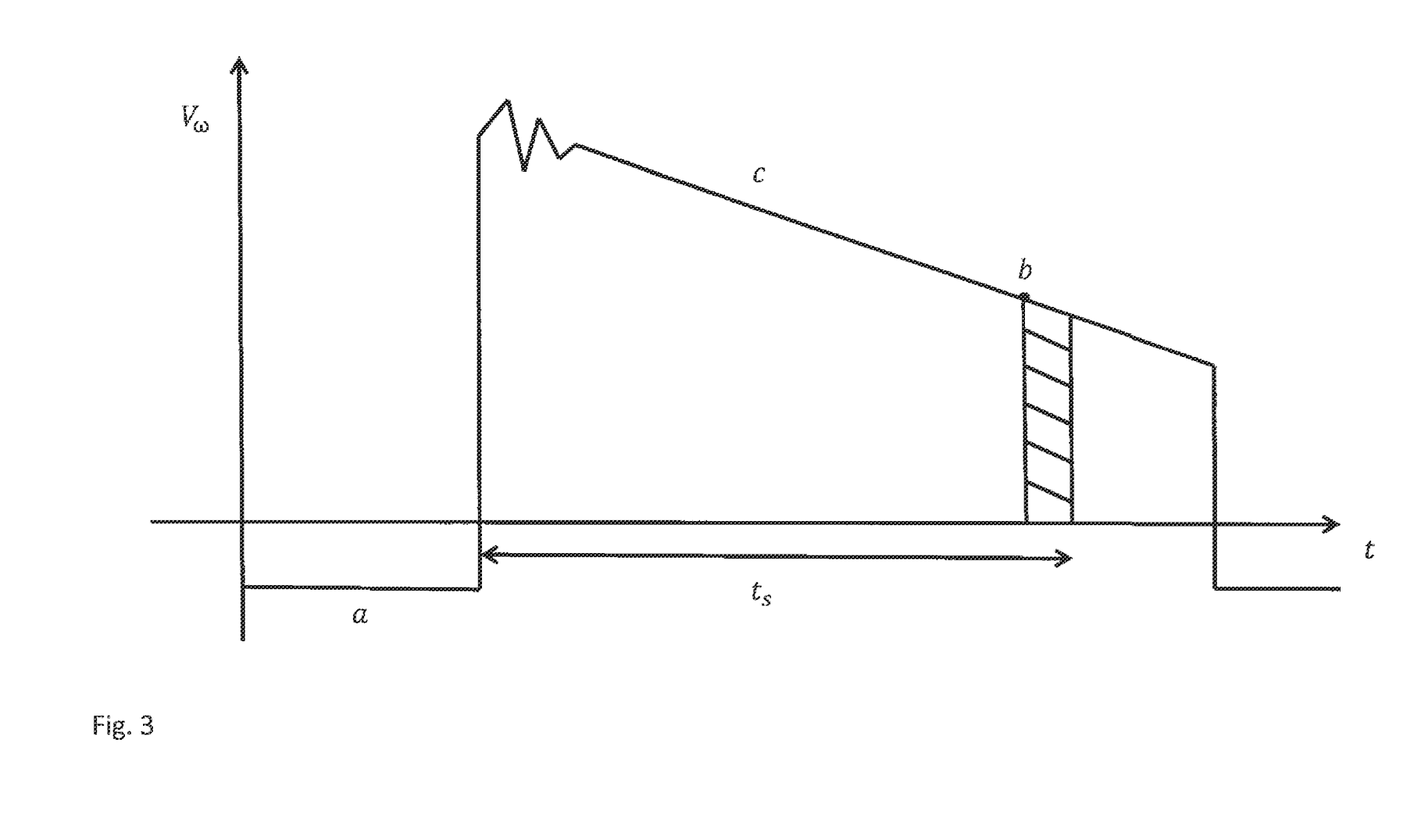
FIG. 3 shows a voltage of a sensing winding of a synchronous flyback converter as a function of time according to an embodiment.
Figure 4:
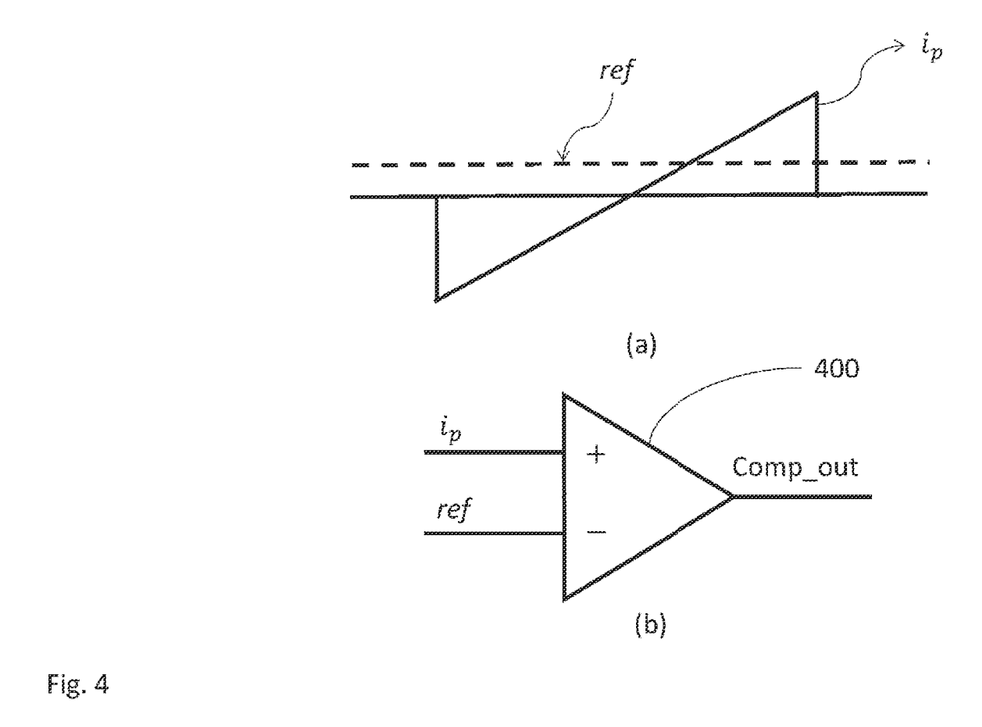
FIG. 4 shows a current (a) and a comparator (b) in a synchronous flyback converter according to an embodiment.
Figure 5:
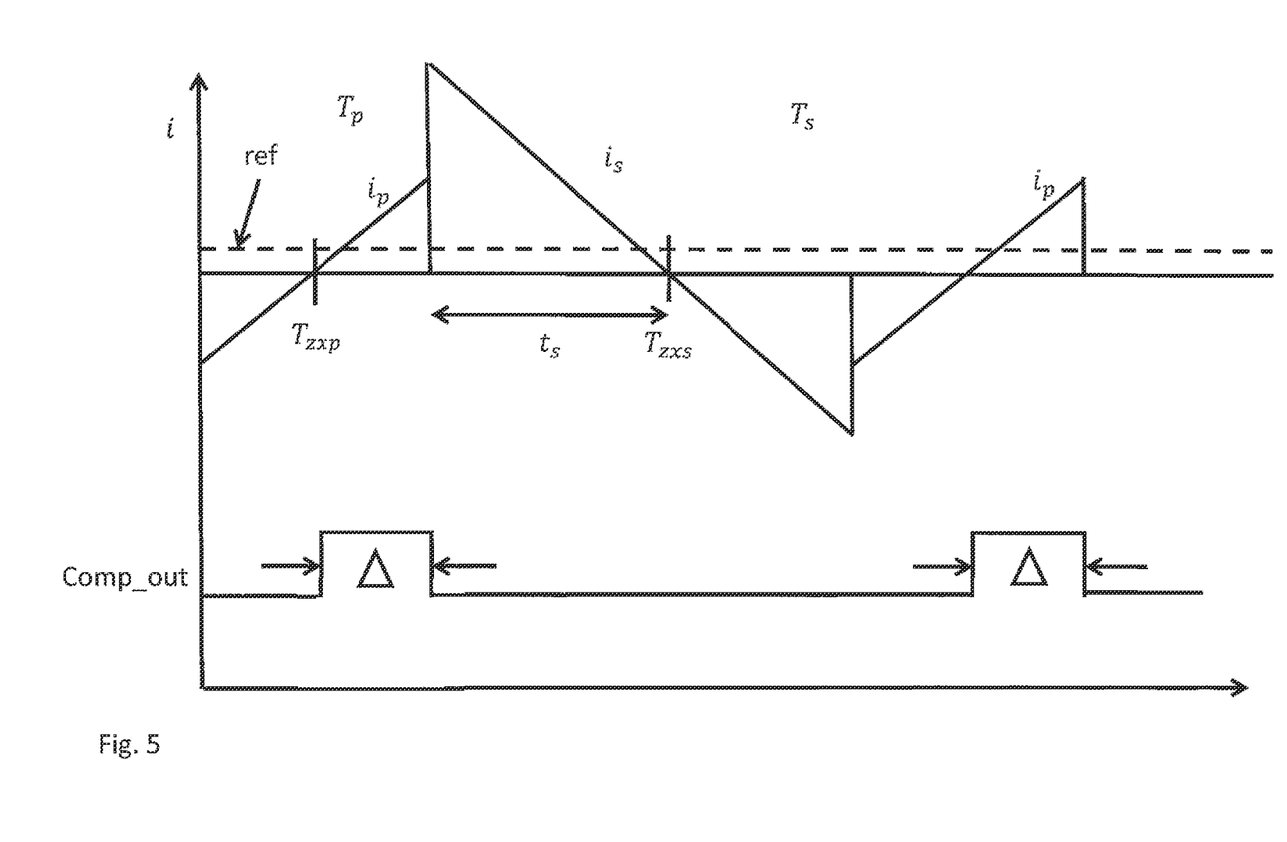
FIG. 5 shows a current and an output of a comparator in a synchronous flyback converter as a function of time according to an embodiment.

In order to get $t_s$, the following steps can be performed:

a) using a shunt measurement for the current on the primary side 102, putting the result on a comparator 400 in FIG. 4(b) (see also FIG. 5);

b) checking when ZX (zero-cross) occurs;

c) measuring $T_p$ and $T_s$;

d) measure, with e.g. a timer, the time interval Δ (see also FIG. 5 for the definition of the time interval Δ); and e) compute the ratio=Δ/Tp, then, from FIG. 3, set $t_s=T_{ZXS}=T_s(\Delta)/T_p$. This corresponds to the optimal time in which to measure the winding voltage $V_w$ that is related to the $V_{LED}$ voltage by the windings ratio.

In FIG. 3, the sensing winding voltage $V_w$ is shown, wherein the first portion a of $V_w$ corresponds to the input voltage $V_B$*factor, wherein the factor depends on the windings. The second portion c of $V_w$ corresponds to the reflected voltage of secondary side, and the voltage $V_w$ in b corresponds to $V_{LED}$*factor.

Figure 6:
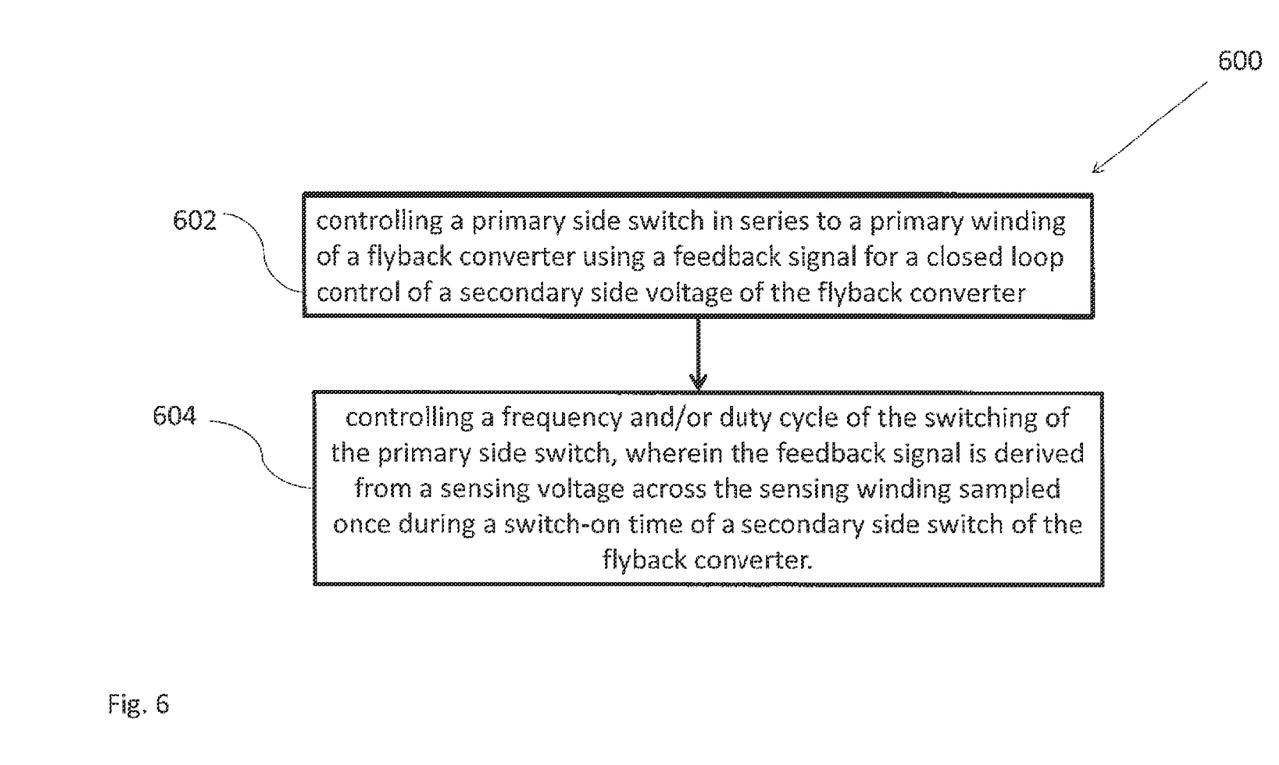
FIG. 6 shows a schematic diagram of a method of a synchronous flyback converter according to an embodiment.

FIG. 6 shows a schematic diagram of a method 600 of a synchronous flyback converter 100 having terminals for supplying an LED load according to an embodiment.

The method 600 comprises the following step:
  controlling 602 a primary side switch S1 in series to a primary winding $L_p$ of the flyback converter 100 using a feedback signal for a closed loop control of the secondary side voltage of the flyback converter 100;
  controlling 604 the frequency and/or duty cycle of the switching of the primary side switch S1, wherein the feedback signal is derived from a sensing voltage across the sensing winding $L_w$ sampled once during a switch-on cycle of a secondary side switch S2 of the flyback converter 100.

Figure 7:
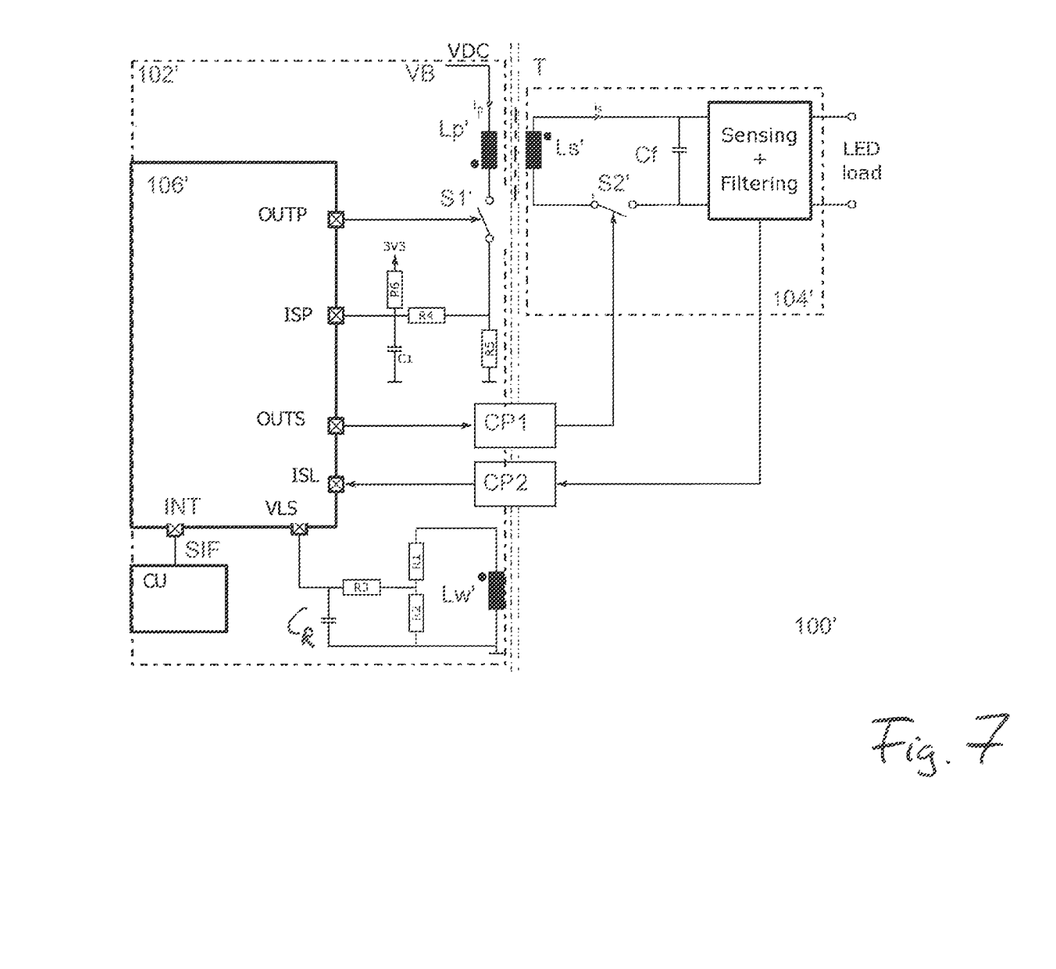
FIG. 7 shows especially the signals supplied to and issued by the control unit, which may be an ASIC.

FIG. 7 shows a further, more detailed embodiment of a synchronous flyback converter 100'. The control unit 106' may be implemented for example as an ASIC (preferably) or a microcontroller.

The control unit has an output terminal OUTP which issues a command which causes the switching of the primary side switch S1' of the synchronous flyback converter.

Furthermore a shunt resistor R5 is connected in series to the primary side switch S1'. Via the shunt resistor R5 and using an optional level adaptation circuitry RISL6, R4, C1, a primary side current signal is supplied to the control unit at an input terminal ISP.

The resistor R6 is supplied with a low DC voltage.

An output terminal OUTS of the control unit issues a control signal for the secondary side switch S2'. A galvanically isolated coupler CP1, e.g. optocoupler, may be provided in order to transfer this control signal from the primary side for the secondary side switch cross the isolation barrier ( ).

The control unit furthermore has an input terminal ISL for being supplied with a secondary-side sensed signal representing the LED current. A further galvanically isolated coupler CP2, e.g. optocoupler, is provided to transfer this feedback signal from the secondary side cross the isolation barrier ( ) to the primary side.

Finally, the auxiliary winding Lw' is shown to be coupled with a secondary side winding Ls' and optionally the primary side winding Lp' of the transformer T in order to sense, on the primary side, a signal representing the secondary side voltage. The auxiliary winding $L_{w'}$ is used for the LED voltage measurement according to this invention, typically taking into account the current states of the switches of the synch flyback (which are states are known to the control circuit 106').

A voltage divider R1, R2, R3 is provided to feed this voltage signal across the auxiliary winding Lw' to a capacitor $C_R$, the DC voltage of which is supplied to an input terminal VLS of the control unit 106'.

As it is evident from the above explanations, the exact timing of the sampling of the LED voltage (VLS in FIG. 7) is important. Thus, in the accuracy in measurements of the timings (such as for example the primary side on time TP, the secondary side on-time TS and the positive part of the on time TP-$T_{ZXP}$) of the primary side switch is of relevance. In case these measurements are inaccurate, the sensed voltage VLS can deviate from the real LED-voltage.

Furthermore, there may be an issue as to extreme values for the sampling time. For example, when there is no negative contribution of the primary side current (for example at start up), and the secondary time is fixed, the sampling time point will be at the end of the secondary conducting phase.

Furthermore, the settling time of a sample & hold processing the signal $V_{SNS}$ (inside the control unit 106') and the control unit has to be considered. The sample & hold unit needs time to charge the sampling capacitor to the sensed voltage. If this time is not considered and the sampling trigger is close to the end of the secondary on time (TS) an inaccurate sampling can occur.

To this regard, it is proposed to add a correction factor to the determination of the sampling time. The correction factor is a constant time increment and can be set for example in steps between 10 and 200 Ns steps, preferably the clocking steps of the control circuit, via a register either inside the control unit 106 or in a configuration unit CU (see FIG. 7) external to the control unit 106', e.g. in a microcontroller functionally connected via a serial interface SIF to the input terminal INT of the control unit 106' (here an ASIC). It may be foreseen that the correction factor can have positive or negative sign by changing a corresponding bit in the register of the configuration unit CU.

The control unit 106' in FIG. 7 may monitor that the sampling point in time is higher than 10 to 200 ns, preferably the time duration of one clock cycle of the control unit (ASIC) which constitutes a minimum pre-set value.

Furthermore, a maximum pre-set value can be preset, which is
   TS-settling time of the sampled & hold unit of the control unit 106'.

The correction value amount and the sign thereof may be made dependent on an internal or external sensing signal of the control unit 106', e.g. representing of the temperature of the LED load, or the electrical load value in order to increase the voltage sensing accuracy over the whole load range.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

The invention claimed is:

1. A synchronous flyback converter (100) having terminals for supplying an LED load, comprising:
   a sensing winding ($L_w$) coupled to a primary winding ($L_p$) of a transformer of the flyback converter (100), and
   a control unit (106) controlling a primary side switch (S1) in series to the primary winding ($L_p$) of the flyback converter (100) using a feedback signal for a closed loop control of a secondary side voltage of the flyback converter (100) by controlling the frequency and/or duty cycle of the switching of the primary side switch (S1), wherein the feedback signal is derived from a sensing voltage across the sensing winding ($L_w$) sampled by the control unit (106) once during a switch-on cycle of a secondary side switch (S2) of the flyback converter (100) or at every n-th switch-on cycle thereof, n being an integer,
   wherein the control unit controls the secondary side switch (S2) such that there are time periods with negative current flow on the secondary side; and
   wherein the sensing voltage is sampled at a point in time when the secondary side current through the secondary side switch (S2) is at least close to zero.

2. The synchronous flyback converter (100) of claim 1, wherein at least close to zero corresponds to 10% the total period of the switch on time.

3. The synchronous flyback converter (100) of claim 1, wherein the control unit (106) controls the secondary side switch (S2).

4. A synchronous flyback converter (100) having terminals for supplying an LED load, comprising:
- a sensing winding (Lw) coupled to a primary winding (Lp) of a transformer of the flyback converter (100), and
- a control unit (106) controlling a primary side switch (S1) in series to the primary winding (Lp) of the flyback converter (100) using a feedback signal for a closed loop control of a secondary side voltage of the flyback converter (100) by controlling the frequency and/or duty cycle of the switching of the primary side switch (S1), wherein the feedback signal is derived from a sensing voltage across the sensing winding (Lw) sampled by the control unit (106) once during a switch-on cycle of a secondary side switch (S2) of the flyback converter (100) or at every n-th switch-on cycle thereof, n being an integer,
- wherein the control unit controls the secondary side switch (S2) such that there are time periods with negative current flow on the secondary side; and
- wherein the control unit (106) is designed to compensate, by applying a calibration value, any contribution of secondary side resistive elements to the sensing voltage if the sensing voltage is not sampled at a point in time at which the secondary side current is zero.

5. A synchronous flyback converter (100) having terminals for supplying an LED load, comprising:
- a sensing winding (Lw) coupled to a primary winding (Lp) of a transformer of the flyback converter (100), and
- a control unit (106) controlling a primary side switch (S1) in series to the primary winding (Lp) of the flyback converter (100) using a feedback signal for a closed loop control of a secondary side voltage of the flyback converter (100) by controlling the frequency and/or duty cycle of the switching of the primary side switch (S1), wherein the feedback signal is derived from a sensing voltage across the sensing winding (Lw) sampled by the control unit (106) once during a switch-on cycle of a secondary side switch (S2) of the flyback converter (100) or at every n-th switch-on cycle thereof, n being an integer,
- wherein the control unit controls the secondary side switch (S2) such that there are time periods with negative current flow on the secondary side, and
- wherein the synchronous flyback converter (100) comprises a comparator (400) configured to compare the primary side current $i_p$ to a reference value $i_{ref}$.

6. The synchronous flyback converter (100) of claim 5, wherein the control unit (106) is configured to measure a time the primary switched is closed ($T_p$) and to calculate a ratio: ratio=$\Delta/T_p$, wherein a time $\Delta$ corresponds to a time interval in which the primary side current $i_p$ is greater than the reference value $i_{ref}$.

7. The synchronous flyback converter (100) of claim 6, wherein the control unit (106) is configured to measure the winding voltage at a time point $t_s$:

$$t_s = (T_s \Delta)/T_p$$

wherein $T_s$ corresponds to the time the secondary switch (S2) is closed.

8. The synchronous flyback converter (100) of claim 7, wherein the control unit (106) is configured to add to the time point $t_s$ a constant correction factor, which optionally may lead to a reduction or increase of the time point ts.

9. The synchronous flyback converter (100) of claim 8, wherein the correction factor is dependent on a sensing signal indicating one or more of a value of the load.

10. The synchronous flyback converter (100) of claim 7, wherein the point in time for the sampling is preset to be within a preset minimum value corresponding to the time duration of one clock cycle of the control unit (106'), between 1 ns and 40 ns, and a maximum value of (Ts-settlingTimeSH), wherein settlingTime SH is a settling time of a Sample & Hold module of the control unit (106') processing the sampled signal.

* * * * *